United States Patent Office 2,908,676
Patented Oct. 13, 1959

2,908,676

RECLAIMING OIL COMPOSITION AND METHOD OF MAKING IT

Edward A. Van Valkenburgh, Greene, N.Y.

No Drawing. Application October 18, 1956
Serial No. 616,621

2 Claims. (Cl. 260—97.5)

This invention relates to an improved homogeneous liquid tall oil composition for use in the reclaiming of rubber and the method of producing it.

The reclaiming oil compositions consist essentially of specially processed crude tall oil compounded with a small amount, less than 10%, of stabilizing liquids.

In the reclaiming of rubber such as whole tire scrap and shredded fiber-free scrap, it has been proposed to use so-called powdered rosin prepared from tall oil. The improved liquid reclaiming composition of the present invention provides an inexpensive replacement for solid rosin in the reclaiming of cured rubber scrap, which has the advantage of improved dispersibility and other advantages over the use of such powdered rosin.

Crude tall oil is a cheap raw material, but rosin progressively crystallizes from it as a solid sludge. This crude cheap material is treated, according to the present invention, to prevent such objectionable rosin separation, by a carefully controlled heat treatment for a prolonged period of time, combined with the addition of a small amount, e.g., 5%, more or less, of a solvent or of mixed solvents to give a homogeneous liquid product which will remain liquid for prolonged periods of time.

In treating the crude tall oil according to the process of the present invention, it is heated to a temperature of about 130° C. and maintained at this temperature for a sufficient period of time to dissolve the excess of rosin crystals and convert the product from a cloudy to a clear liquid. Overheating of the tall oil during the prolonged heating is avoided to avoid loss of desirable solvent constituents which are volatilized at higher temperatures. By carefully controlling the heating and continuing it for a sufficient time, the excess of rosin crystals appear to be dissolved rather than melted and, after the addition of the small amount of stabilizing liquids, appear to remain dispersed in meta stable equilibrium in the fluid matrix with a minimum tendency to crystallize even after prolonged storage.

The stabilizing liquids are added during the prolonged heating of the tall oil and advantageously near the end of the heating process, and with continuation of the heating and agitation after the stabilizing liquids are added. And it is also important to continue the agitation after the heating is discontinued and during the slow and gradual cooling of the composition.

The result of the prolonged and regulated heating of the tall oil and of the limited percentage of added stabilizing liquids is to convert the rosin crystals or abietic acid into a stable or stabilized form, such that crystallization and separation of solid abietic acid is prevented or greatly retarded. The prolonged heating brings about a substantial increase in viscosity of the tall oil and some reduction in acid value; but the product nevertheless has a high acid value which makes it a valuable reclaiming composition.

The time of heating the crude tall oil at a temperature of around 130° C. can be somewhat varied, but a prolonged heating is advantageous, e.g., around 24 to 50 hours. For example, the heating of one crude tall oil product for 24 hours at 128–130° C. increased the viscosity at 100° F. from 263 cs. to 343 cs., and gave a product which was clear in appearance, in contrast with the cloudy appearance of the tall oil during the early period of treatment; and the acid number was decreased from 165.8 to 161.3. Continued heating for 48 hours increased the viscosity to 428 cs. and reduced the acid value to 159.8.

The heating of the tall oil is advantageously effected, prior to the addition of the stabilizing liquids, until a clear product is obtained, which contains the initially solid rosin crystals in a dissolved form, e.g., 24–50 hours at around 130° C. and with efficient mechanical agitation.

The stabilizing liquids which are used to the extent of less than 10% of the specially heat-treated tall oil include oxygenated compounds such as diethylene glycol and the oxygenated product sold by the Ennjay Company under the trade name "Heavy Oxo Fraction"; non-volatile aromatic oils such as the coal tar distillate sold under the trade name "Bardol" by the Barrett Company, and the aromatic hydrocarbon oil sold by the Ennjay Company under the trade name "Aromatic HB." Small amounts of naphthenic hydrocarbon oils can also be used in admixture with the above, such as the naphthenic hydrocarbon oils sold by the Sun Oil Company under the trade names "Circo" and "538." These are different names for substantially the same naphthenic hydrocarbon oils having a viscosity, SSU at 100° F., of between 55 and 60, a flash point (minimum) of 275° F., a fire point (minimum) of 305° F., a pour point (maximum) of −50° F., and a specific gravity of 7.54 pounds per gallon. The "Heavy Oxo Fraction" is a byproduct recovered in the isooctyl alcohol synthesis, having an initial boiling point of about 200° C., with 90% boiling at about 370° C., an hydroxyl number of around 125 to 150, with a specific gravity at 20° C. of about 0.853, an alcohol content of around 52%, with about 5% of isooctyl alcohol, 5% of nonyl alcohol and 37–42% of higher alcohols, and with the remainder of the product made up mainly of esters of hexadecyl alcohol.

The aromatic hydrocarbon oil "Aromatic HB" above referred to has an initial boiling point of 400–490° F., with 90% boiling at 584–700° F., a flash point of 190–230° F. and an A.P.I. gravity of around 20.5 to 24, and is essentially a mixture of high boiling unsaturated aromatic and refined hydrocarbons having a total aromatic content of around 64.5% by volume.

The invention will be further illustrated by the following examples, but it will be understood that the invention is not limited thereto.

*Example 1.*—Crude tall oil is heated to about 130° C. for a prolonged period of time sufficient to form a clear liquid, e.g., for a period of 24 to 30 hours. To 96.5 parts by weight of tall oil so heated, there is added 1.5 parts of diethylene glycol with continued heating for ½ hour and then a further addition of 2 parts of heavy naphthenic hydrocarbon oil (Sun Oil No. 538) with a further period of heating, followed by discontinuing of the heating and stirring of the product over night with the heat off and with gradual cooling of the product, e.g. through a 12-hour period.

*Example 2.*—In a similar way, tall oil is heated at 128–131° C. for a period of about 36 hours with increase of the viscosity at 100° F. from 309 to 458 and reduction in acid value from 166 to 159.3. To 92.5 parts by weight of the thus treated oil is added 1.5 parts of diethylene glycol and 6 parts of the heavy naphthenic hydrocarbon oil (Sun Oil No. 538), with further heating for an hour at 130° followed by turning off the heat and allowing the products to cool over night with stirring.

*Example 3.*—By the same procedure described in Example 2, there is added to 92.5 parts of the treated tall oil 5.0 parts of aromatic oil (Bardol) and 2.5 parts of naphthenic oil (Sun Oil No. 538).

*Example 4.*—By the same procedure described in Example 2, there is added to 95 parts of the treated tall oil 5 parts of aromatic oil (Bardol), and the process otherwise carried out as described in Example 2.

*Example 5.*—In a similar manner to that described in Example 1 or Example 2, 92.5 parts of the treated tall oil have added thereto 4.0 parts of aromatic oil (Bardol) and 3.5 parts of naphthenic hydrocarbon oil (Sun Oil No. 538) and the heating is continued after the addition of the stabilizing liquids and slowly cooled by continuing the stirring over night after the heating is discontinued.

*Example 6.*—In a similar manner, 93 parts of the heat treated tall oil is compounded with 2 parts of the oxygenated product of the Ennjay Company, "Heavy Oxo Fraction," 2 parts of aromatic oil (Bardol) and 3 parts of naphthenic hydrocarbon oil (Sun Oil No. 538).

*Example 7.*—In a similar manner, 92.5 parts of the heat treated tall oil have added thereto 3 parts of the Ennjay "Heavy Oxo Fraction" and 4.5 parts of the petroleum aromatic oil (Aromatic HB).

While the process can be carried out and compositions made containing only one of the stabilizing liquids, they may advantageously be used in combination, as illustrated in the above examples.

The prolonged heat treatment of the tall oil at a regulated temperature, combined with the addition of the small amount of stabilizing liquids, results in the production of valuable liquid reclaiming compositions with a minimum amount of stabilizing liquids therein and which are valuable liquid products for use in the reclaiming of rubber in lieu of the so-called powdered rosin from tall oil.

The new stabilized liquid products are advantageously used as reclaiming oils, for example in the high pressure steam digest method of reclaiming whole tire scrap, and particularly in the "open pan" or heater process for the reclaiming of shredded fiber-free scrap, in place of solid rosin. Thus, in the open pan reclaiming process, in dealing with usually light colored stocks, the liquid reclaiming composition can be used in rather liberal amounts, such as 4% on the scrap or even larger quantities, and can be used in conjunction with a limited percentage of solvent naphtha. The improved liquid reclaiming oils have the advantage of improved dispersibility in the rubber and greater penetrating efficiency because of their liquid state.

I claim:

1. The process of producing liquid tall oil compositions for use in the reclaiming of rubber which comprises subjecting crude tall oil containing rosin crystals therein to prolonged heating with agitation at about 130° C. for a sufficient period to effect a substantial increase in the viscosity of the tall oil and to dissolve the rosin crystals in the tall oil and form a clear liquid product, thereafter incorporating in the tall oil at such temperature a small amount of a stabilizing liquid solvent to stabilize the composition against precipitation of solids therefrom and continuing the heating and agitation at such temperature to form a homogeneous liquid product, the total period of heating of the tall oil at about 130° C. being for about 24 to 50 hours, and continuing the agitation after the heating is discontinued and during slow and gradual cooling of the product, the proportions of stabilizing liquid solvent being between about 3.5 and 7.5 parts for 96.5 to 92.5 parts of tall oil, and the stabilizing liquid being a liquid non-volatile at the temperature of heating selected from the class which consists of liquid aromatic hydrocarbon oils, liquid naphthenic hydrocarbon oils, diethylene glycol, and mixtures thereof.

2. Liquid reclaiming oils for the reclaiming of rubber consisting of from about 92.5 to 96.5% of heat treated tall oil which has been heated for prolonged periods of time at about 130° C. to substantially increase its viscosity and to form a clear liquid with the normally solid resins of the tall oil in solution therein and containing from about 3.5 to 7.5% of a stabilizing liquid, which is a liquid non-volatile at the temperature of heating, selected from the class which consists of liquid aromatic hydrocarbon oils, liquid naphthenic hydrocarbon oils, diethylene glycol, and mixtures thereof.

References Cited in the file of this patent

UNITED STATES PATENTS

| 2,483,797 | Valkenburgh | Oct. 4, 1949 |
| 2,657,147 | Valkenburgh | Oct. 27, 1953 |
| 2,736,662 | Valkenburgh | Feb. 28, 1956 |
| 2,776,275 | Strazdins | Jan. 1, 1957 |

FOREIGN PATENTS

| 700,528 | Great Britain | Dec. 2, 1953 |